(12) United States Patent
Preusker

(10) Patent No.: US 7,380,394 B2
(45) Date of Patent: Jun. 3, 2008

(54) APPARATUS FOR ADJUSTABLY CONNECTING TWO CHAIN LINKS OF A CLOSED LINK CHAIN WITHOUT THE USE OF TOOLS AT VARYING DISTANCES AND/OR FOR REPAIRING A BROKEN LINK CHAIN

(75) Inventor: Werner Preusker, Sauldorf (DE)

(73) Assignee: Confon AG, Rheineck (CH)

( * ) Notice: Subject to any disclaimer, the term of this patent is extended or adjusted under 35 U.S.C. 154(b) by 0 days.

(21) Appl. No.: 11/496,575

(22) Filed: Aug. 1, 2006

(65) Prior Publication Data

US 2006/0260289 A1    Nov. 23, 2006

Related U.S. Application Data

(63) Continuation of application No. PCT/CH2005/000010, filed on Jan. 13, 2005.

(30) Foreign Application Priority Data

| Feb. 7, 2004 | (CH) | ..................................... 186/04 |
| Apr. 16, 2004 | (CH) | ..................................... 672/04 |
| Sep. 21, 2004 | (CH) | ..................................... 1547/04 |

(51) Int. Cl.
*B60C 27/06* (2006.01)
*B66C 1/10* (2006.01)
*F16G 15/00* (2006.01)

(52) U.S. Cl. ................. 59/93; 59/78; 59/84; 294/82.12

(58) Field of Classification Search .................... 59/78, 59/80, 84, 93; 24/82.12; D8/382, 499
See application file for complete search history.

(56) References Cited

U.S. PATENT DOCUMENTS

| 1,368,175 | A | * | 2/1921 | McFee | ......................... 59/85 |
| 1,385,554 | A | | 7/1921 | Hugh | |
| 1,456,361 | A | * | 5/1923 | Clark | ........................... 59/87 |
| 1,598,680 | A | | 9/1926 | Grace | |
| 1,631,346 | A | | 7/1927 | Franklin | |
| 2,165,377 | A | * | 7/1939 | Henry | ..................... 24/116 R |
| 2,703,476 | A | * | 3/1955 | Donaldson | ..................... 59/93 |
| 3,335,468 | A | * | 8/1967 | Harley | ..................... 24/115 R |
| 4,176,874 | A | * | 12/1979 | Archer | ..................... 294/82.12 |
| 4,248,469 | A | * | 2/1981 | Knox | ..................... 294/82.12 |

(Continued)

FOREIGN PATENT DOCUMENTS

CH          386 865 A        1/1965

(Continued)

OTHER PUBLICATIONS

International Search Report dated Oct. 3, 2006 in PCT/CH2005/000010, filed Jan. 13, 2005 (10 pages).

*Primary Examiner*—David B Jones
(74) *Attorney, Agent, or Firm*—Shlesinger, Arkwright & Garvey LLP

(57) ABSTRACT

Device configured for modifying the length of snow chains or guard chains. For this purpose, two recesses are disposed on a shaped disk and are interlinked by a sliding slot. The distance of the adjacent chain links is modified by slipping the chain links through the sliding slot into a different recess.

7 Claims, 3 Drawing Sheets

U.S. PATENT DOCUMENTS

| | | | | |
|---|---|---|---|---|
| 4,391,313 A | * | 7/1983 | Weidler | 59/85 |
| 4,416,319 A | * | 11/1983 | Hofmann | 24/116 R |
| D277,548 S | * | 2/1985 | Halsnes | D8/499 |
| 4,860,532 A | * | 8/1989 | Milz | 59/93 |
| 4,941,698 A | * | 7/1990 | Klibert et al. | 294/82.12 |
| 5,732,545 A | * | 3/1998 | Fredriksson | 59/93 |

FOREIGN PATENT DOCUMENTS

| | | |
|---|---|---|
| CH | 670 488 A5 | 6/1989 |
| DE | 77 32 129 U1 | 2/1978 |
| DE | 30 14 061 A1 | 10/1981 |

* cited by examiner

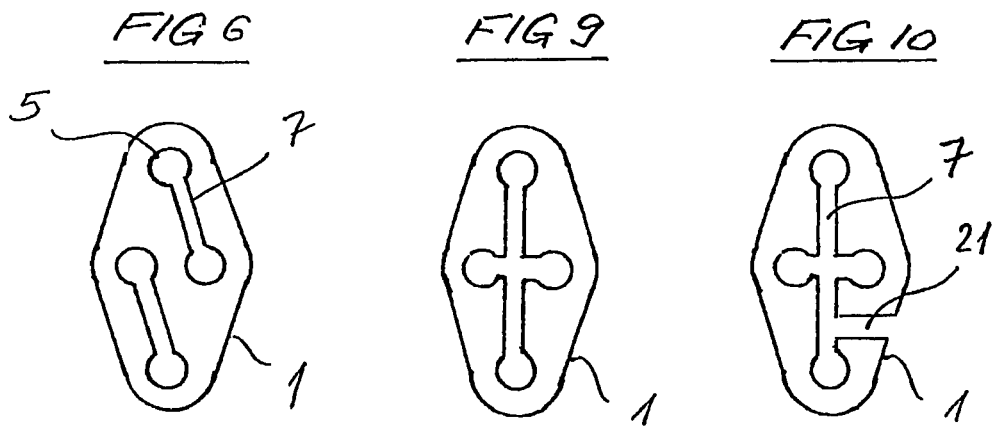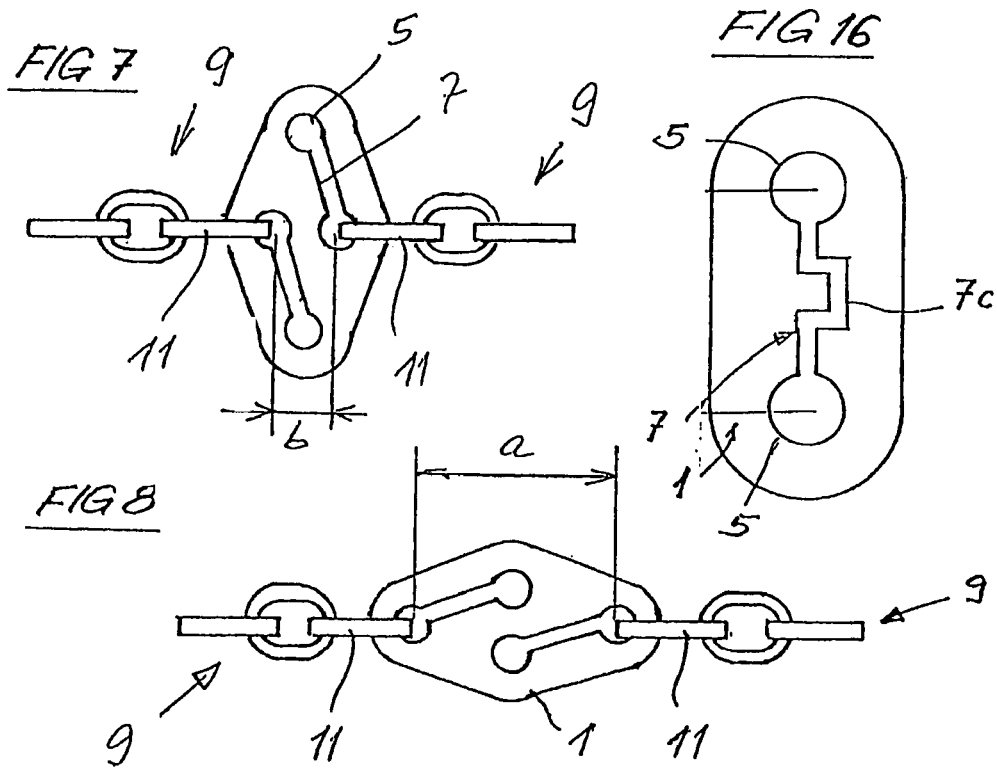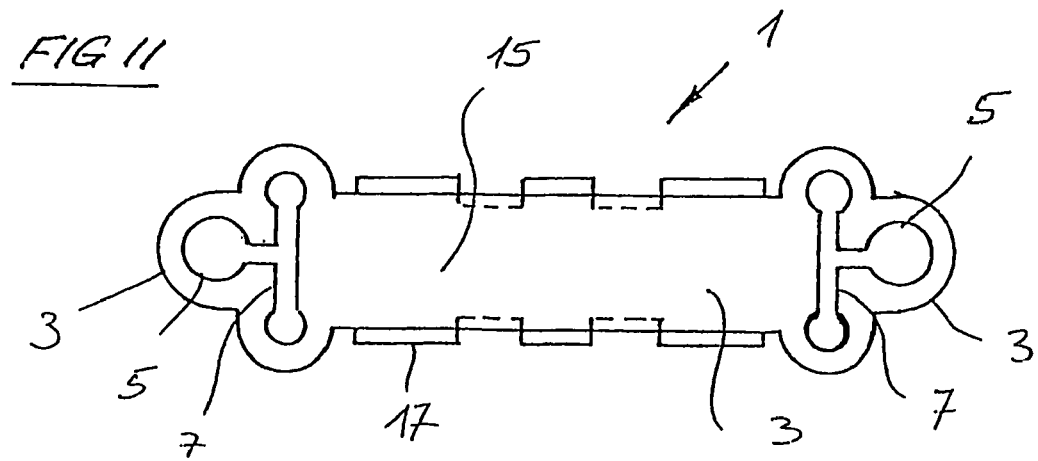

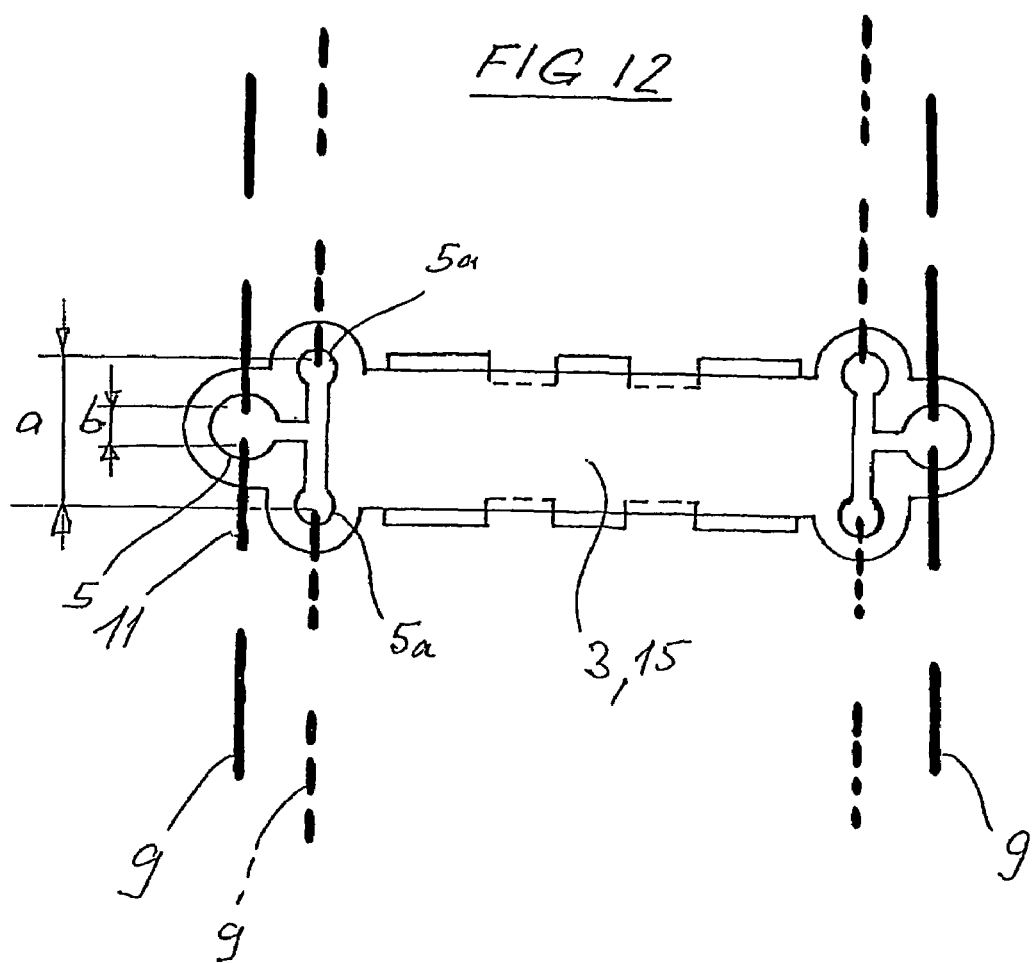
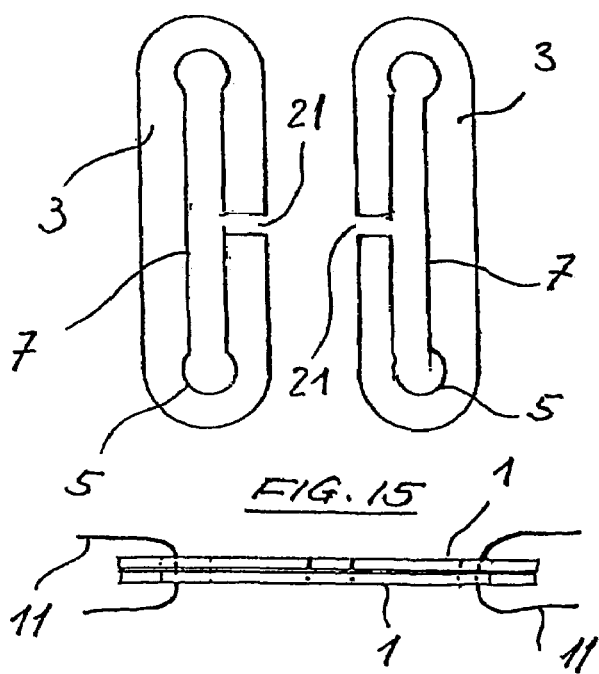
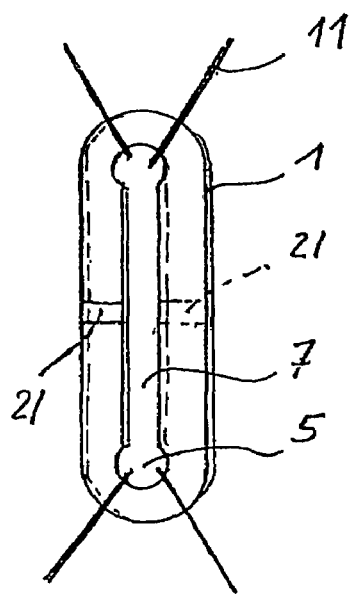

APPARATUS FOR ADJUSTABLY CONNECTING TWO CHAIN LINKS OF A CLOSED LINK CHAIN WITHOUT THE USE OF TOOLS AT VARYING DISTANCES AND/OR FOR REPAIRING A BROKEN LINK CHAIN

CROSS-REFERENCE TO RELATED APPLICATIONS

This application is a continuation of application no. PCT/CH2005/000010, filed Jan. 13, 2005, which claims the priority of Swiss application no. 1547/04, filed 21 Sep. 2004, and which application no. PCT/CH2005/000010 claims the priority of Swiss application no. 672/04, filed 16 Apr. 2004, and which application no. PCT/CH2005/000010 claims the priority of Swiss application no. 186/04, filed 7 Feb. 2004, and each of which is incorporated herein by reference.

FIELD OF THE INVENTION

The invention relates to an apparatus or device for adjustably connecting two chain links of a closed link chain without the use of tools at varying distances and/or for repairing a broken link chain without the use of tools at varying mutual distances and/or for repairing a broken link chain with a connecting link that can be inserted between two chain links.

BACKGROUND OF THE INVENTION

Closed chains, chain nets, snow chains, protective tire chains, and other chain systems are not adjustable in terms of length and width (in the case of grid or ladder chains) unless the chain is opened and/or individual chain links are opened in order to remove or add chain links. The same applies for jewelry chains.

Many variants for connecting the last links in a finite chain by way of a special connecting element are also known in the art. Such a connection becomes necessary most frequently when chains break; for example, breaks on snow chains of motor vehicles or on protective tire chains of utility vehicles operating in stone quarries and similar environments. The problem that emerges when two ends of a broken chain must be connected is the fact that, most of the time, no suitable tools are available on site where the break occurred in order to install a regular chain link that was cut open for that purpose and must be welded closed again after having been inserted. Welding on the wheel is generally not possible because this may cause damage to the tire. Any removal of the chain armor from protective chains is extremely complex and creates, moreover, costs associated with the disruption of operations during the disassembly, repair work, and new installation.

Accordingly, repair chain links are already known in the prior art that can be connected to the links of the broken chain right on the vehicle. The repair chain links are often comprised of a ring with an overlapping thread that extends over a certain area in the way of a helical line. Chain links of this type can be inserted directly on the wheel into the outermost-lying chain links and then pressed together with the assistance of a strong pair of pliers. Also known are, furthermore, repair links that feature an (open) C-form; the only way to guide them around the neighboring chain links is with a pair of pliers, and then they must be bent in a backward direction. Reconnecting a broken chain without the use of tools is not possible with any of the known prior art repair links. Moreover, the repair links are usually only a short-term solution because, since they must be bendable after installation, they may not be manufactured of a hardened material. At a later time they must be replaced at a repair shop with other durable links. This requires additional expense.

OBJECTS AND SUMMARY OF THE INVENTION

An object of the invention includes providing a device for shortening, lengthening, and/or repairing a chain link without the use of tools.

This object is achieved with a device for at least one of adjustably connecting two chain links of a closed link chain without the use of tools at varying mutual distances and for repairing a broken link chain. The device includes a connecting link configured for being inserted between two chain links, the connecting link including a shaped plate. Two cut-outs are arranged on the connecting link at a distance relative to each other, and a slide slot connects the two cut-outs.

Advantageous configurations of the invention are outlined as set forth below and herein.

With the inventive connecting link, which is inexpensive to produce, it is possible to reduce or enlarge the distance between two chain links, as well as to connect chain links, which are adjacent to the broken chain link, with each other without any further need for tools. The length or width of the chain can be changed without opening chain links. Moreover, it is unnecessary for tire chains to be taken off the tire.

In addition, it is possible to insert a replacement part between two chain links of, e.g., protective tire chains for vehicles in stone quarries, because it is possible to manufacture the connecting link of hardened steel.

The connecting link can be used irrespective of the make of the chain.

The invention will be explained now in more detail using the illustrated embodiments.

Relative terms such as up, down, left, and right are for convenience only and are not intended to be limiting.

BRIEF DESCRIPTION OF THE DRAWINGS

FIG. 6 is a further embodiment of the connecting link with two independent receptacles;

FIG. 7 is the connecting link in accordance with FIG. 6 with a chain strand of a chain held inside the link at a small distance;

FIG. 8 is a connecting link in accordance with FIG. 6 with a chain strand of a chain held inside the link at a large distance;

FIG. 9 is a further embodiment of a plate-shaped connecting link;

FIG. 10 is a further advantageous embodiment of the connecting link in accordance with FIG. 9, but with an insertion slot, before incorporation in a chain;

FIG. 11 is a further embodiment of the connecting link for ladder chains; and FIG. 12 is a schematic representation of the chain positions in a connecting link according to FIG. 11;

FIG. 13 is a further advantageous embodiment of a two-part connecting link with an insertion slot before incorporation in a chain;

FIG. 14 is a perspective view of the two connecting links in accordance with FIG. 13 in a chain (the chain being depicted schematically);

FIG. 15 is a side view of the connecting links in accordance with FIG. 14 and of the chain links threaded therein; and FIG. 16 is a further embodiment of the connecting links.

DETAILED DESCRIPTION OF THE INVENTION

Figure 1:
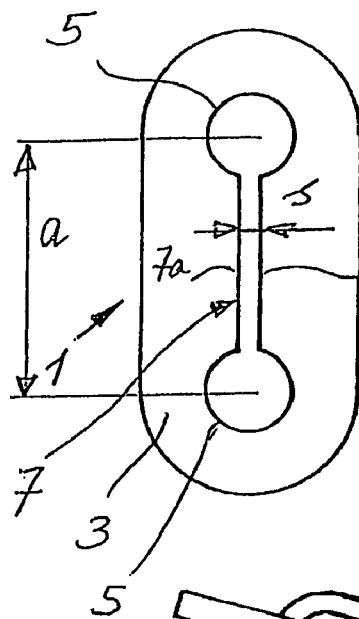
FIG. 1 is a plate-shaped connecting link for single strand or double-strand chains.

FIG. 1 is a first embodiment of the invention and shows a connecting link 1 including a shaped plate 3 that has arranged on it, at distance a, two circular cut-outs 5 that are connected to each other by a slide slot 7. The width s of slot 7 is preferably only slightly larger than the diameter d of the wire of a chain 9 that is to be connected by way of connecting link 1. The wire can have any cross-section, i.e. round, angular, square, oval. It is preferred that the width of slot 7 is smaller than double the diameter d of the chain wire.

Figure 4:
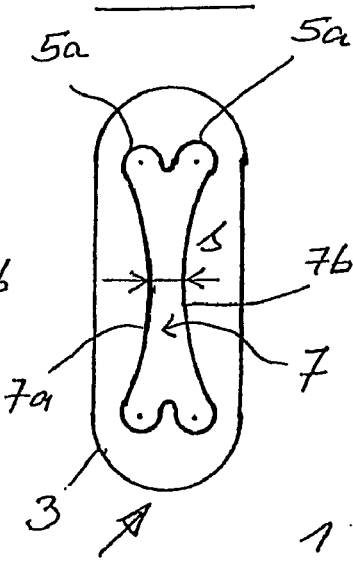
FIG. 4 is a second embodiment of a plate-shaped connecting link.

In the configuration of shaped plate 3 in accordance with FIG. 4 four smaller cut-outs 5a in a heart shape take the place of the two circular cut-outs 5, and they are connected with each other by a slide slot 7. Slide slot 7 is not delimited by two parallel side edges 7a and 7b in this configuration but by two arched edges that approach each other reaching in one place the distance s. Distance s corresponds, in turn, to an amount that is somewhat bigger than diameter d of the wire from which chain links 11 of chain 9 are manufactured.

Figure 5:
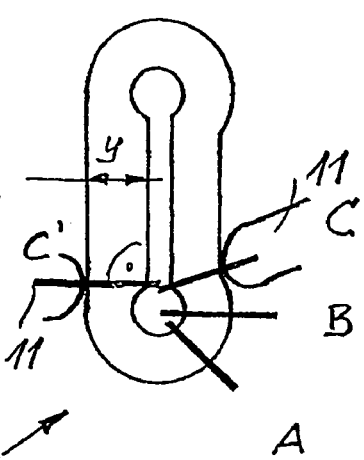
FIG. 5 is a view that shows the position in which a chain link can be moved to a different position in the connecting link.

FIG. 5 is a graphic depiction that any displacement of a chain link 11 from the bottom-lying cut-out 5 to the top-lying cut-out is not possible from a first position A and not from a position B but only from a preset angular position, which is position C or C'. In positions C, C' the clear length of the remaining opening in chain link 11 corresponds to the width Y of the bar on connecting link 3. This prevents individual chain links 11 from inadvertently changing position within connecting link 1 when, while chain 9 is being stored, chain 9 is not taut. The position change is consequently only possible at a preset angle, i.e. of 90 degrees.

Figure 2:
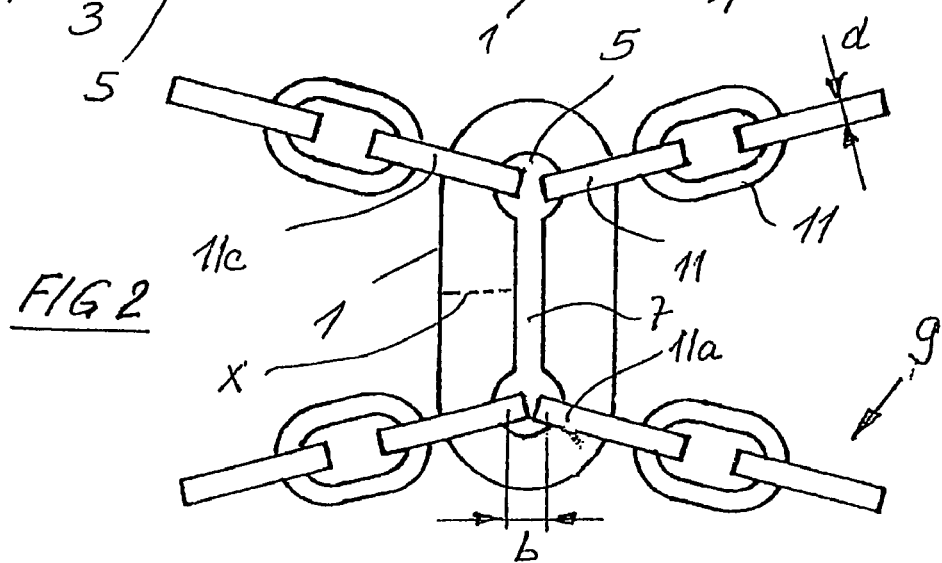
FIG. 2 is the connecting link in accordance with FIG. 1 with two chain strands of a double-track chain held inside the link at a small distance.

Using FIGS. 2 and 3 and connecting link 1, as shown in FIG. 1, the function of connecting link 1 in a chain 9 will be explained in more detail. Two chain links 11 respectively of chain link 7 are held in cut-outs 5 inside connecting link 1 according to FIG. 2. Chain links 11 can be inserted in cut-out 5 either in an opened state and then welded in place, or shaped plate 3 was slotted before inserting chain links 11 in a closed state at site X and then welded closed, if stability requirements call for it. Chain links 11 in FIG. 2 are part of a snow chain with two chain strands that lead from connecting link 1 in a V-shape to a bar that connects the two chains 9, not shown here. Distance b between adjacent chain links 11, which are to be connected by connecting link 1, is very small in FIG. 2.

Diameter D of cut-out 5 is bigger than width s of slide slot 7. Width s of slide slot 7 is, furthermore, smaller than double the diameter d of the wire including chain links 11.

Figure 3:
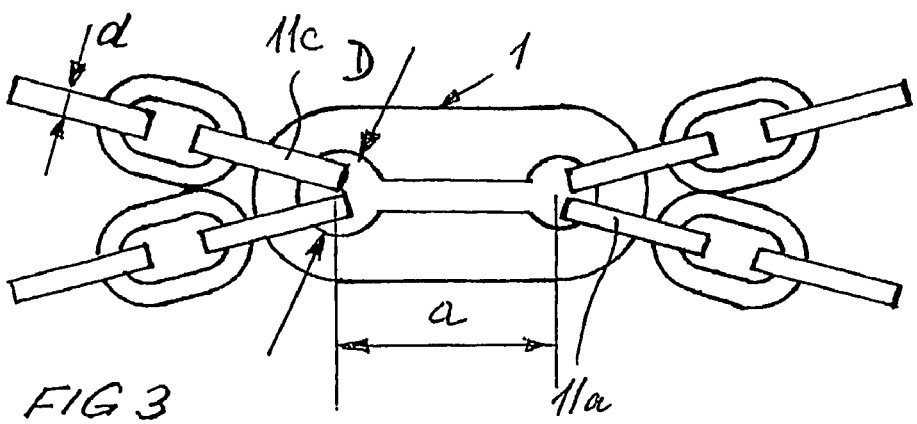
FIG. 3 is the connecting link in accordance with FIG. 1 with two chain strands of a double-track chain held inside the link at a large distance.

If, for example, the chain link identified with reference number 11a is moved inside slide slot 7 in an upward direction to top-lying cut-out 5 and then the chain link identified with reference number 11c is moved to the bottom-lying cut-out 5, connecting link 1 will rotate clockwise to the horizontal position as shown in FIG. 3 with tensile force being applied to chains 9. The distance between chains 9 connected by way of connecting link 1 is now enlarged to amount a. Distance a is four times as big in the shown example as distance b according to FIG. 2. This corresponds approximately to the length of an additional chain link 11.

In the configuration of the invention according to FIG. 16 an obstacle 7c is inserted in slide slot 7 with the configuration, for example, of a meander. Slide slot 7 consequently no longer runs in a straight line from the first to the second cut-out 5; instead it is now subdivided in five sections, i.e. three sections that run parallel and two sections extending essentially in a perpendicular direction relative to the former. This step (obstacle) safely prevents any of chain links 11 from gliding inadvertently from one cut-out 5 to another cut-out when chain 9 is not in use and, for example, stored in a bag or in a container. Naturally, with this configuration of the invention as well it is possible to provide an insertion slot 21 as explained in more detail below in the context of FIGS. 13 to 15.

With a snow chain in the delivery/new state connecting link 1 will be inserted in accordance with FIG. 3 and can, either when installing the tire for the first time or after a certain amount of wearing down of the tire and of the chain links 1 due to wear and tear, be rotated to the position in accordance with FIG. 2 in order to get the right chain length.

The way the configuration of the invention according to FIG. 4 functions corresponds exactly to the functionality as described in FIGS. 2 and 3.

FIGS. 6 to 9 represent further configurations of connecting link 1; and whereby these are suitable embodiments of connecting links 1 for single-guided chain strands. Their function is demonstrated in FIGS. 7 and 8. The respectively last chain link 11 of both chains 9 is pushed in the respective slide slot 7 to the respectively other cut-out 5. This will modify the mutual distance from smaller amount b to larger amount a. Naturally, with these embodiments (according to FIGS. 6 and 9) it is also possible to connect two chain strands that run toward each other in a V-shape.

In the configuration according to FIG. 10 connecting link 1, the shape of which corresponds to that in FIG. 9, is provided with a laterally arranged insertion slot 21. This slot allows for inserting a chain link 11 in guide slot 7. The use of this configuration of connecting link 1 will be described below.

The configuration of the invention according to FIG. 11 depicts a particularly suitable connecting link 1 for a ladder chain. The configuration of cut-outs 5 and slots 7 corresponds essentially to the way they are configured in FIG. 9. In principle, these are two shaped plates 3 that are linked by a central bar 15. Attached in one piece to bar 15 are from the plane of shaped plate 3 tabs 17 that are bent in an upward and/or downward direction. They are intended to provide better grip to the ladder chain, i.e., the tabs 17 make contact with the surface of the pavement, just like the chains, during the rolling action of the tire.

To ensure that the chain strands of both chains 9 will always be parallel to each other when changing their length, connecting link 1 is not rotated but instead there is a parallel re-hanging of chain links 11 from an outside-lying position, i.e. from the outer cut-outs 5 through slots 7 into the two inside-lying cut-outs 5a that are separated from each other (compare chain 9 shown by perforated lines). During re-hanging the distances a and b in the shown case change by a factor 3.

Connecting links 1 represented in FIGS. 10, 13 and 14 have two functions. They can be used, on the one hand, as elements for adjusting the length of a chain 9; but they serve, on the other hand, additionally as repair links that can take the place of a broken chain link. But as repair links they can simultaneously take over the function of a length adjustment link.

Subsequently, the function and the assembly of connecting links 1 as repair elements will be explained in accordance with FIGS. 10, 13 and 14. In the event of a chain break, broken chain link 11 is removed and the two neighboring chain links 11 are first inserted into the one slotted connecting link 1. After that, the second connecting link 1, rotated by 180°, is also connected to chain links 11 that were previously threaded into the first connecting link 1. Now the two connecting links 1 are pushed toward each other until they come to rest against each other. This way the two insertion slots 21, which are not arranged on top of each other, can be closed off by way of overlapping (compare FIG. 14). The two hung chain links 11 can now withstand loads and are securely attached to each other. Analogously, the use of connecting links 1 as adjustment links allows also for threading and securely connecting the four last chain links 11 of both chains 9 in accordance with FIGS. 2 and 3. Welding of the connecting links is not necessary.

Shaped plate 3 that includes connecting link 1 can be manufactured as a die-stamped part, as a metal injection-molded part or as a welded part. Shaped plate 3 can be a hardened plate or hardened only on the surface.

Connecting link 1 according to the invention can be used irrespective of the make of the snow chains or protective chains for vehicles in stone quarries. It is not important in this context if the chain is made of round or angular wire.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

The invention claimed is:

1. Device for adjustably connecting four chain end links of a double-track chain having two parallel chains, and each of the two parallel chains having two chain end links constituting a wire havin a diameter for a total of four chain end links, and for adjustably connecting the four chain end links without the use of tools, and at varying mutual distances, the device comprising:
   a) a single connecting link including a shaped plate;
   b) at least two cut-outs arranged on the shaped plate of the single connecting link, and the at least two cut-outs being spaced apart at a distance relative to each other;
   c) at least one slide slot connecting the at least two cut-outs;
   d) the at least two cut-outs and the connectin slide slot forming a closed space unconnected to a periphery of the single connecting link;
   e) the width of the at least one slide slot being smaller than twice the diameter of the wire constituting the chain links; and
   f) the diameter of the cut-outs being larger than twice the diameter of the wire constituting the chain links.

2. Device as claimed in claim 1, wherein:
   a) a meandering obstacle is provided in the at least one slide slot.

3. Device as claimed in claim 2, wherein:
   a) the connecting link includes one of a die-stamped, bent, welded, and metal injection-molded part.

4. Method of using a device for adjustably connecting four chain end links of a double-track chain having two parallel chains, and each of the two parallel chains having two chain end links constituting a wire having a diameter for a total of four chain end links, and for adjustably connecting the four chain end links without the use of tools, and at varying mutual distances, the method comprising:
   a) providing the device, the device including:
      i) a single connecting link including a shaped plate;
      ii) at least two cut-outs arranged on the shaped plate of the single connecting link, and the at least two cut-outs being spaced apart at a distance relative to each other;
      iii) at least one slide slot connecting the at least two cut-outs;
      iv) the at least two cut-outs and the connecting slide slot forming a closed space unconnected to a periphery of the single connecting link;
      v) the width of the at least one slide slot being smaller than twice the diameter of the wire constituting the chain links; and
      vi) the diameter of the cut-outs being larger than twice the diameter of the wire constituting the chain links;
   b) providing a double-track chain having two parallel chains, and each of the two parallel chains having two chain end links constituting a wire having a diameter for a total of four chain end links; and
   c) varying the mutual distance between the four chain end links without the use of tools by moving the tour chain end links of the device within the at least two cut-outs and the at least one slide slot of the shaped plate of the single connecting link, and by rotating the shaped plate and the at least one slide slot, so that two of the four chain end links are in respective ones of the at least two cut-outs.

5. Method as claimed in claim 4, wherein:
   a) the doubletrack chain having two parallel chains includes at least one of snow chains, protective tire chains, and chain nets.

6. Method of using a device for repairing a chain of a double-track chain having two parallel chains, and each of the two parallel chains having chain links constituting a wire having a diameter for a total of four chain links, and for repairing a broken one of the four chain links without the use of tools, the method comprising:
   a) providing the device, the device including:
      i) a single connecting link including a shaped plate;
      ii) at least two cut-outs arranged on the shaped plate of the single connecting link, and the at least two cut-outs being spaced apart at a distance relative to each other;
      iii) at least one slide slot connecting the at least two cut-outs;
      iv) an insertion slot connecting the connecting slide slot to a periphery of the single connecting link, and a diameter of the insertion slot being larger than the diameter of the wire constituting the chain links;

v) the width of the at least one slide slot being smaller than twice the diameter of the wire constituting the chain links; and vi) the diameter of the cut-outs being larger than twice the diameter of the wire constituting the chain links;

b) providing a double-track chain having two parallel chains, and each of the two parallel chains having two chain links constituting a wire having a diameter for a total of four chain links, and one of the chain links being broken;

c) removing the broken chain link from two adjacent unbroken chain links;

d) inserting the two adjacent unbroken chain links into insertion slot of the single connecting link; and e) moving the two unbroken chain links into respective ones of the at least two cut-outs, and so that the single connecting link has replaced the removed broken chain link and connects the two unbroken chain links for repairing the chain.

7. Method as claimed in claim 6, wherein:

a) the double-track chain having two parallel chains includes at least one of snow chains, protective tire chains, and chain nets.

\* \* \* \* \*